United States Patent [19]

Jensen et al.

[11] Patent Number: 5,745,072
[45] Date of Patent: Apr. 28, 1998

[54] METHOD AND APPARATUS FOR PRECISE NONCOHERENT DOPPLER TRACKING OF A SPACECRAFT

[75] Inventors: James Robert Jensen; Robert Steven Bokulic, both of Columbia, Md.

[73] Assignee: The Johns Hopkins University, Baltimore, Md.

[21] Appl. No.: 717,395

[22] Filed: Sep. 20, 1996

[51] Int. Cl.$^6$ ...................................................... G01S 13/58
[52] U.S. Cl. .......................... 342/104; 342/115; 342/50; 342/46
[58] Field of Search ..................... 342/104, 50, 46, 342/47, 48, 77, 115

[56] References Cited

U.S. PATENT DOCUMENTS

| | | | |
|---|---|---|---|
| 3,740,671 | 6/1973 | Crow et al. | 333/70 |
| 3,860,921 | 1/1975 | Wood | 342/109 |
| 4,001,690 | 1/1977 | Mack et al. | 325/4 |
| 4,060,809 | 11/1977 | Baghdady | 342/451 |
| 4,689,806 | 8/1987 | Von Der Embse | 375/111 |
| 4,785,463 | 11/1988 | Janc et al. | 375/1 |
| 4,901,368 | 2/1990 | Arnold et al. | 455/12 |
| 5,063,387 | 11/1991 | Mower | 342/103 |
| 5,187,805 | 2/1993 | Bertiger et al. | 455/12.1 |
| 5,414,431 | 5/1995 | McCoskey | 342/352 |
| 5,594,454 | 1/1997 | Bevereux et al. | 342/357 |
| 5,644,572 | 7/1997 | Olds et al. | 370/324 |

OTHER PUBLICATIONS

J.W. Armstrong et al., "Starprobe: Coronal Plasma Turbulence Effects on Tracking and Telemetry", Presented at the AIAA 20th Aerospace Sciences Meeting, Jan. 11–14, 1982 in Orlando, Florida.

*Primary Examiner*—John B. Sotomayor
*Attorney, Agent, or Firm*—Francis A. Cooch

[57] ABSTRACT

A method and apparatus are disclosed for making precise velocity measurements of a spacecraft using a two-way noncoherent Doppler tracking system. By comparing the received uplink and transmitted downlink frequencies on-board the spacecraft, information is generated that is included in the downlink signal and used to cancel spacecraft oscillator drift rate effects in the two-way Doppler measurement made by the ground station. This data can also be used to characterize the drift rate of the spacecraft oscillator, thus permitting periods of accurate one-way Doppler tracking by the ground station.

10 Claims, 3 Drawing Sheets

METHOD AND APPARATUS FOR PRECISE NONCOHERENT DOPPLER TRACKING OF A SPACECRAFT

STATEMENT OF GOVERNMENTAL INTEREST

This invention was made with Government support under Contract No. N00039-95-C-0002 awarded by the Department of the Navy. The Government has certain rights in the invention.

BACKGROUND OF THE INVENTION

The invention relates to spacecraft Doppler tracking and, more specifically, is a method and apparatus for canceling space-craft oscillator drift effects during two-way noncoherent tracking to provide a spacecraft velocity measurement within a 0.1 mm/second degree of accuracy.

In a conventional two-way, coherent spacecraft navigation implementation, an uplink carrier is transmitted from the ground at a frequency $f_t$. the spacecraft transponder multiplies the received frequency by a factor of $\alpha$, and transmits a downlink carrier at this frequency. The uplink and downlink frequencies are Doppler-shifted by the spacecraft motion. The frequency received on the ground is $$f_r^{coh} = \alpha f_t \left( \frac{1 - v/c}{1 + v/c} \right) \quad (1)$$

where c is the speed of light and v is the rate of change of the distance between the spacecraft and the ground station. Because $f_t$ and $\alpha$ are known on the ground, the Doppler component of this signal can be extracted. This can be done to a high degree of accuracy assuming that the ground oscillator frequency ($f_t$) is highly stable over the round-trip propagation time. A stability of 1 part in $10^{13}$ is typically adequate.

Unfortunately, transponders utilizing coherent tracking are typically heavy and expensive to build. Furthermore, the coherency requirement is a barrier to revolutionary changes in transponder design.

For a noncoherent velocity measurement, the spacecraft generates a downlink signal at a frequency $f_d$ that is not coherent with the uplink signal. The signal received on the ground is then $$f_r^{non} = \frac{f_d}{1 + v/c} \quad (2)$$

where $f_d$ is measured in a ground reference frame. A frequency error in the knowledge of $f_d$ of only 1 part in $10^{10}$ will result in a velocity error of a few centimeters per second. This is an unacceptable error if it cannot be accurately removed from the measurement. Previous ideas for noncoherent navigation have been limited either by spacecraft oscillator stability or have required changes to ground station equipment to support special downlink signaling formats designed to cancel spacecraft oscillator drift.

What is needed then is a method and apparatus for two-way noncoherent measurement of spacecraft velocity for navigation that provides cancellation of oscillator drift effects and is compatible with existing ground station equipment. It must also provide accuracy equivalent to present-day two-way coherent systems (<0.1 mm/second).

SUMMARY OF THE INVENTION

The method and apparatus of the invention provide for simplification of spacecraft hardware by establishing a new approach for Doppler tracking of the spacecraft radio signals. This new approach permits the transponder to be broken into separate transmitter and receiver elements, with the Doppler tracking performed noncoherently.

As shown in FIG. 1, a measurement of the received uplink frequency, $f_u$, is made in the spacecraft relative to an on-board oscillator. The same oscillator is used to generate the downlink signal, $f_d$. The on-board measurement is telemetered to the ground and used to correct the two-way Doppler measurement made by the ground station. Spacecraft oscillator drift rate effects are cancelled out in the process.

The invention provides for 0.1 mm/second accuracy with no required changes to ground station hardware. Other advantages of the invention include:

(1) Non-critical on-board oscillator requirements, i.e., an ultra-stable oscillator is not necessarily required.

(2) Elimination of two-way tracking noise. This improves the performance of systems that use two frequency bands such as an X-band for the uplink and Ka-band for the downlink.

(3) The ability to characterize the on-board oscillator drift during flight. This will permit periods of accurate one-way tracking in the event that an uplink signal is not available.

DETAILED DESCRIPTION OF THE INVENTION

The two-way, noncoherent Doppler tracking method of the invention is based on the idea that the uplink and downlink signals can be compared within the spacecraft and this information can be used to correct the Doppler measurement made on the ground to determine the velocity of the spacecraft. A key aspect of the invention then is making a measurement on-board the spacecraft that is related, through known parameters, to the ratio of the uplink signal, $f_u$, received by the spacecraft and the transmitted downlink signal, $f_d$, and including this information within the spacecraft telemetry for use in precisely determining the spacecraft velocity on the ground.

Figure 1:
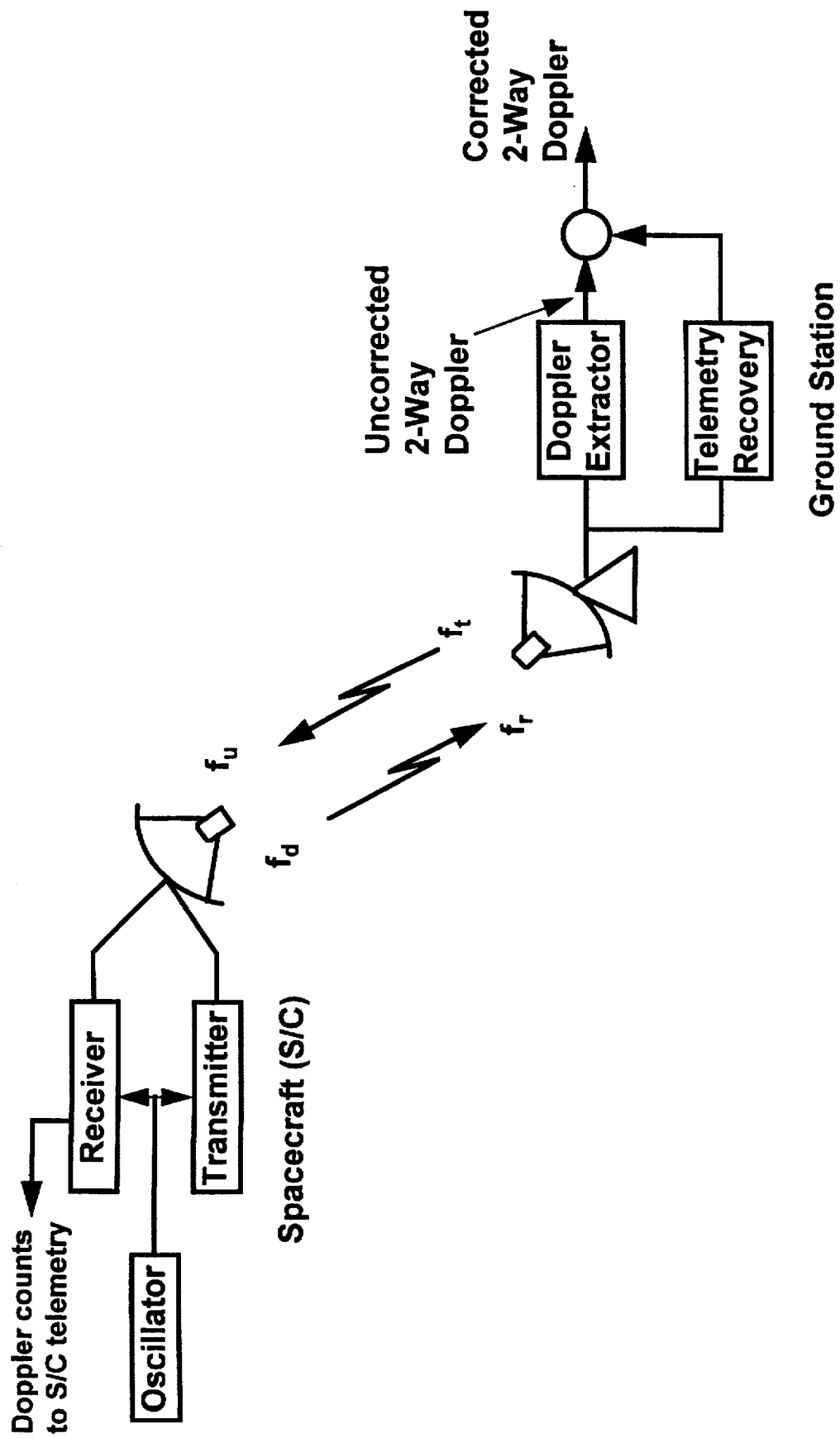
FIG. 1 illustrates the overall system concept which includes the invention for precise noncoherent Doppler tracking of a spacecraft.
Figure 2:
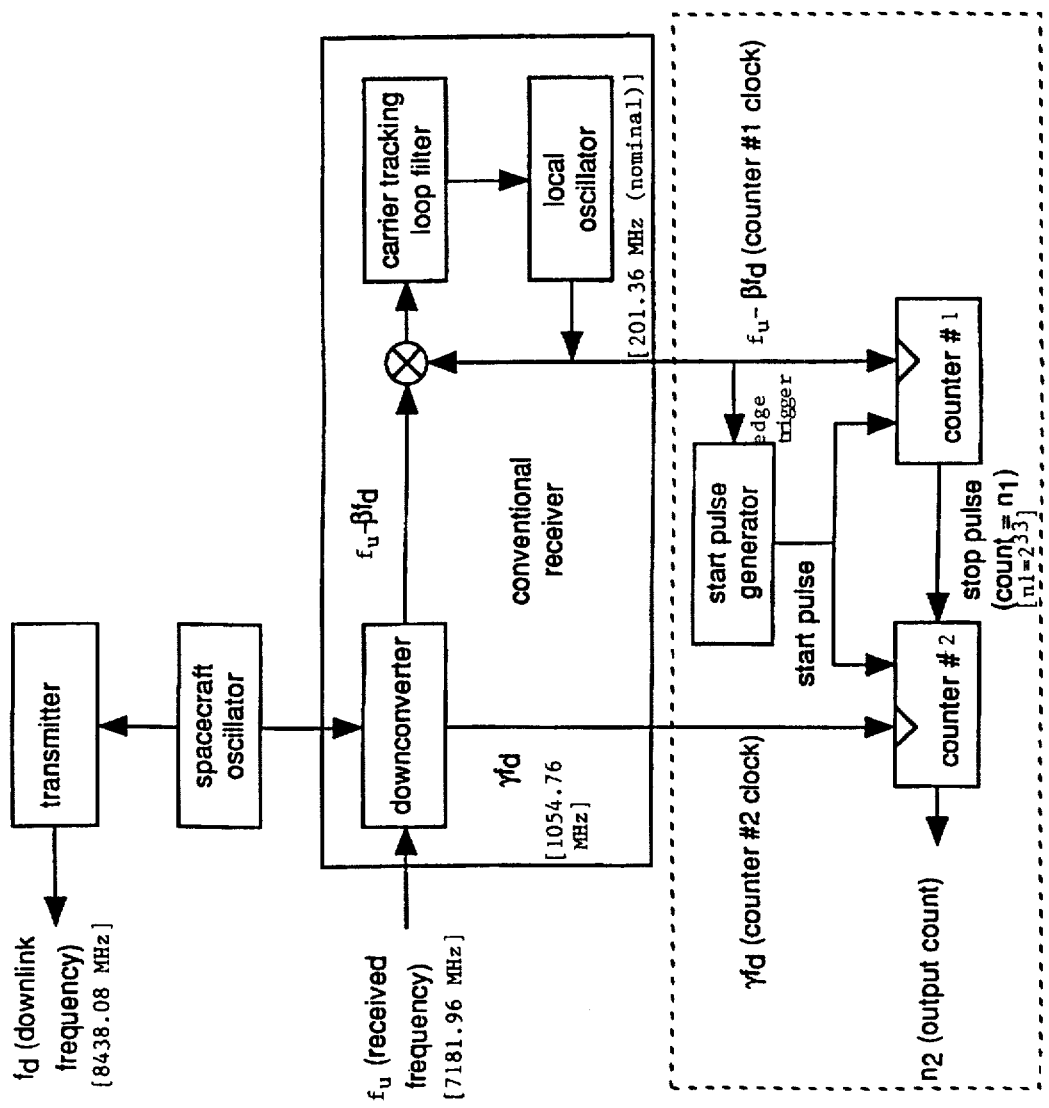
FIG. 2 is a block diagram illustrating a typical spacecraft hardware implementation of the invention.

FIG. 2 shows a hardware implementation of the invention. The spacecraft oscillator outputs a signal that is used for generating the downlink frequency, $f_d$, as well as reference frequencies, $\beta f_d$ and $\gamma f_d$, for the downconversion and counting processes. Zero-crossings of the downconverted received signal, are then counted by counter #1. Counter #2 is used to count zero-crossings of a reference frequency, $\gamma f_d$, related to the downlink signal. After counter #1 reaches a predetermined number of counts it will stop counter #2. The result of this process is a ratio $n_2/n_1$ that is related, by known parameters, to the ratio of the received uplink frequency, $f_u$, to the transmitted downlink frequency, $f_d$. The value $n_1$ is predetermined and the measured value $n_2$ is transmitted to the ground in the spacecraft telemetry.

The resolution of the $n_2$ measurement is increased by downconverting (linearly translating) the uplink signal to as low a frequency as possible before using it to drive counter

1. This effect is illustrated by the following example. Suppose that counter #1 is running at a 2 GHz frequency under zero velocity conditions. If a Doppler shift of +2 MHz occurred, then the counter would be operating at a frequency that is 0.1% higher. If the 2 GHz signal was linearly translated to 200 MHz before driving counter #1, then a Doppler shift of +2 MHz would represent a 1.0% increase in frequency instead. Because the $n_2$ count is equal to (f$_{counter}$ 2/f$_{counter\ 1}$)$n_1$, its resolution is directly related to the sensitivity of the counter #1 frequency to Doppler shifts. For the above example, we have increased the resolution of counter #2 by a factor of 10.

From FIG. 2 The output count, $n_2$, will be $$n_2 = \frac{n_1 f_d \gamma}{[f_t(1-v/c) - f_d \beta]} + \epsilon = \frac{n_1 \gamma}{[(f_u/f_d) - \beta]} + \epsilon \quad (3)$$

where $f_d$ is the downlink frequency transmitted by the spacecraft, $f_t$ is the uplink frequency transmitted by the ground station, $f_u$ is the uplink frequency received by the spacecraft, v is the rate of change of the distance between the spacecraft and the ground station, and $\epsilon$ is an error term due to the quantization effect of counter #2. The impact of this error term, which varies randomly between +1, can be made as small as desired by making $n_1$, large; therefore, it will be dropped from further calculations. It is easily included in the final result if desired. The output count, $n_2$, which is related through known parameters to the ratio of the received uplink and transmitted downlink frequencies, will be included within the spacecraft telemetry and used to correct the velocity measurement by correcting for spacecraft oscillator drift rate effects in the two-way Doppler measurement made by the ground station.

A significant advantage of this invention over other non-coherent techniques is that it requires no changes to the ground station hardware. The ground system processes the downlink signal as if it was coherent with the uplink signal. The velocity measurement made on the ground will be in error, but by an amount that can be determined by the spacecraft count. In this way, the velocity measurement on the ground does not require a change in hardware or procedures, except to impose a correction based upon spacecraft telemetry.

If the received signal in Equation (2) above is processed as if it was the result of a two-way, coherent system, then the velocity estimate produced will be $$v^{non} = c\frac{\alpha f_t - f_r}{\alpha f_t + f_r} = c\frac{\alpha f_t - f_d(1+v/c)}{\alpha f_t + f_d(1+v/c)} \quad (4)$$

where $f_r$ is the frequency received at the ground station. This estimate is in error due to lack of precise knowledge of the spacecraft frequency $f_d$. By solving Equation (3) for $f_d$ and inserting it into Equation (4), we have the result $$v^{non} = \frac{v(q+1) + c(1q-1)}{v(q-1) + c(q+1)} c \quad (5)$$

where $$q = \alpha \left( \beta \pm \frac{n_1}{n_2} \gamma \right).$$

The ± sign is taken to be the sign of $f_u - f_d\beta$. The true velocity may be recovered from the raw measurement ($v^{non}$), the measured value of $n_2$, and the known parameters $n_1$, $\alpha$, $\beta$, and $\gamma$ as:

$$v = \frac{v^{non}(1+q) + c(1-q)}{v^{non}(1-q) + c(1+q)c} \quad (6)$$

In this way, a velocity measurement made with existing equipment and procedures can be corrected with the aid of telemetry information to produce an accurate velocity measurement with a two-way, noncoherent system.

The analysis above implicitly assumes that any drift in the spacecraft oscillator is negligible over the one-way propagation time from the spacecraft to the ground. If the oscillator drifts by a relative amount $\delta$ during the one-way propagation time, then the computed velocity will be in error by $c\delta/2$. If the error is to be maintained at a level below 0.1 mm/second, then this error term indicates that the drift must be less than $6\times 10^{-13}$ over the propagation time, implying that an ultra-stable oscillator (USO) is required on the spacecraft. However, if the measurement made on the spacecraft is delayed by the one-way propagation time before being used to correct the ground measurement, then both measurements will effectively be counts of the same oscillator cycles. This technique significantly relaxes the stability requirement on the spacecraft oscillator, thereby eliminating the need for a USO-class oscillator. In all cases, it is assumed that the ground transmitter is highly stable ($<<10^{-13}$ over the one-way propagation time), a requirement that is easily met by typical ground station equipment.

The invention results in a Doppler measurement that is independent of spacecraft oscillator frequency drift without the need for a USO. Furthermore, using the measurements described above, the frequency of the spacecraft oscillator can be inferred on the ground. Through a series of such inferences, the drift rate of the oscillator can be determined in-flight. This will provide for periods of accurate one-way Doppler tracking during periods when two-way tracking is not available (such as during ground transmitter outages).

The invention also eliminates two-way radio noise from the tracking system. This noise can degrade the tracking accuracy, particularly in systems that use two frequency bands such as X-band for the uplink and Ka-band for the downlink.

To provide a concrete example of the invention outlined above, a realistic spacecraft X-band transceiver will be considered. We will assume typical deep space uplink and downlink frequencies of 7181.96 and 8438.08 MHz, respectively. FIG. 2 has been suitably annotated with corresponding counter and local oscillator frequencies. In this example, the frequency of counter #1 (201.36 Mhz) is relatively low compared to the frequency of counter #2 (1054.76 MHz), a desirable feature. Other pertinent parameters for our example are listed in Table 1.

TABLE 1

Parameters for example implementation

| Parameter | Value |
|---|---|
| α | 880/749 |
| β | 7/8 |
| γ | 1/8 |
| $n_1$ | $2^{33}$ |

Figure 3:
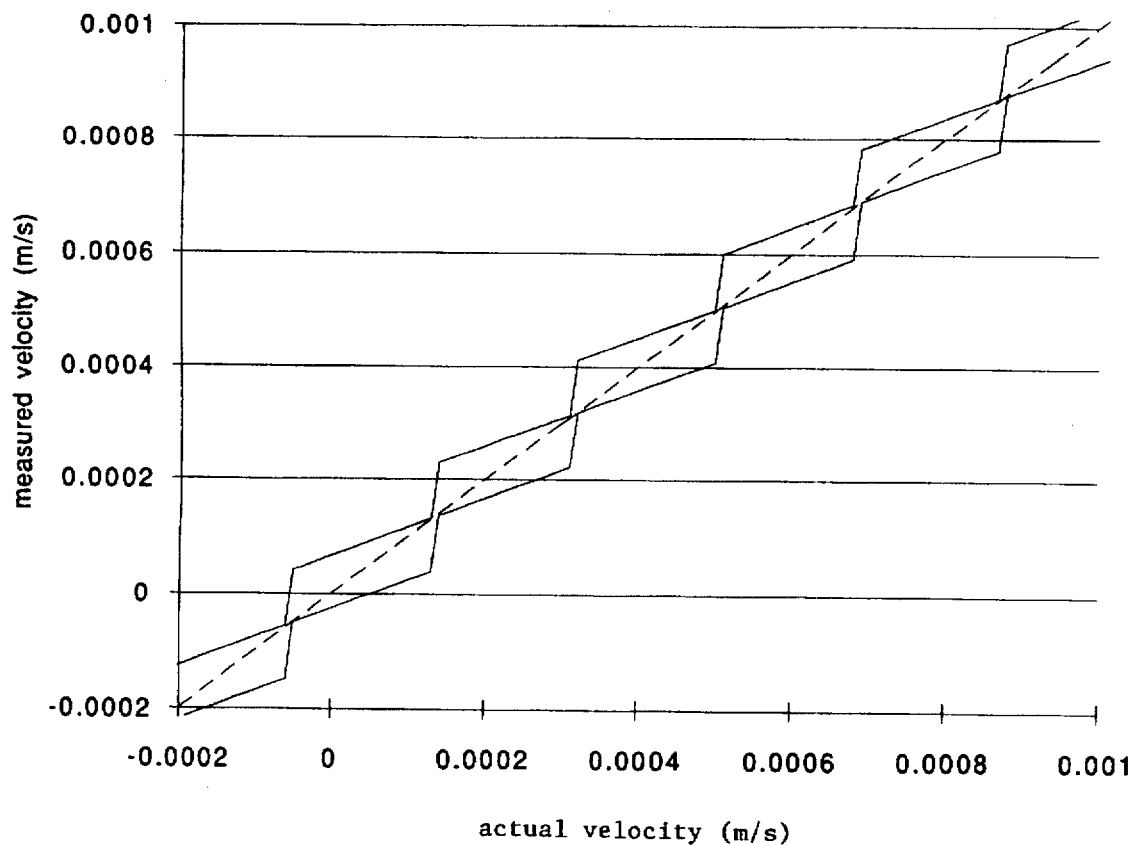
FIG. 3 is a graph illustrating the results of a specific implementation of FIG. 2.

With counter #1 in this example running at 201 MHz, the time to reach a count of $2^{33}$ will be about 43 seconds. Counter #2 is running at 1.05 GHz, which is quite possible with existing technology. The velocity measurement that results from this implementation is shown in FIG. 3. The two solid curves represent the upper and lower limits of the measured velocity. These excursions result from the fact that the time interval measurement is quantized by counter #2, as discussed previously. For the parameters in Table 1, the maximum error is about 0.1 mm/second. The error can be reduced if desired by increasing the counting time (increasing $n_1$) or employing a frequency scheme that results in an even smaller value of the counter #1 frequency.

The invention provides for a comparison of the uplink and downlink frequencies on board a spacecraft in such a way that precise velocity measurements may be made with a two-way noncoherent system, thus eliminating much of the frequency multiplication and division present in coherent transponders. This will allow for the replacement of existing coherent transponders with a simpler system so as to reduce the cost and weight of the spacecraft electronics. Furthermore, the use of the invention need not result in any change in the existing ground system. Only a correction to the measured velocity, contained in telemetry information received by the ground station, is required.

We claim:

1. A method for determining the velocity of a spacecraft during two-way noncoherent Doppler tracking comprising the steps of:

comparing, on-board the spacecraft, a frequency of a downlink signal and a frequency of an uplink signal, the downlink signal frequency being noncoherent with the uplink signal frequency, the downlink signal frequency to obtain information about the comparison;

including the comparison information in the downlink signal to a ground station; and determining the velocity of the spacecraft using the comparison information to correct a two-way Doppler measurement made by the ground station.

2. A method for determining the velocity of a spacecraft during two-way noncoherent Doppler tracking comprising the steps of:

measuring, on-board the spacecraft, a value related to a ratio of an uplink signal frequency received by the spacecraft to a downlink signal frequency transmitted by the spacecraft; the downlink signal frequency being noncoherent with the uplink signal frequency including the measured value in the spacecraft telemetry to a ground station; and determining the velocity of the spacecraft using the measured value to correct a two-way Doppler measurement made by the ground station.

3. The method as recited in claim 2, wherein the measured value comprises a number of zero-crossing counts of a reference frequency, the reference frequency being related to the downlink signal frequency, the number being determined by the time required to reach a predetermined number of zero-crossing counts of the uplink signal frequency, the uplink signal frequency having been previously downconverted.

4. The method as recited in claim 3, the determining the velocity step comprising the step of using the measured value to correct for spacecraft oscillator drift rate effects in the two-way Doppler measurement made by the ground station.

5. The method as recited in claim 2, the measuring step comprising the steps of:

counting a predetermined number of zero-crossings of the uplink signal frequency, the uplink signal frequency having been previously downconverted; and counting a number of zero-crossings of a reference frequency, the reference frequency being related to the downlink signal frequency, the counting beginning simultaneously with the predetermined number counting and ending when the predetermined number has been reached, wherein the number comprises the measured value.

6. The method as recited in claim 5, the determining the velocity step comprising the step of using the measured value to correct for spacecraft oscillator drift rate effects in the two-way Doppler measurement made by the ground station.

7. The method as recited in claim 5, the measuring step further comprising the step of increasing the resolution of the measured value by downconverting the uplink signal frequency to as low a frequency as possible.

8. The method as recited in claim 2, the measuring step comprising the steps of:

generating the downlink signal frequency;

generating a first reference frequency and a second reference frequency, the first and second reference frequencies being determined by the downlink signal frequency;

downconverting the uplink signal frequency using the first reference frequency to as low a frequency as possible;

using the downconverted uplink signal frequency to drive a first counter to a predetermined number of zero-crossing counts;

using the second reference frequency to drive a second counter to a measured number of counts, the second counter starting simultaneously with the first counter and the first counter stopping the second counter when the predetermined number of zero-crossing counts is reached, wherein the measured number of counts is the measured value.

9. A method for determining the velocity of a spacecraft during one-way noncoherent Doppler tracking comprising the steps of:

measuring, on-board the spacecraft, a value related to a ratio of an uplink signal frequency received by the spacecraft to a downlink signal frequency generated by an on-board oscillator and transmitted by the spacecraft; the downlink signal frequency being noncoherent with the uplink signal frequency;

including the measured value in the spacecraft telemetry to a ground station;

inferring the on-board oscillator frequency from the measured value and a two-way Doppler measurement made by the ground station;

repeating the measuring, including and inferring steps to produce a series of on-board oscillator frequency inferences;

determining an inferred on-board oscillator drift rate using the series of on-board oscillator frequency inferences; and during one-way Doppler tracking by the ground station, determining the velocity of the spacecraft using the inferred on-board oscillator drift rate.

10. Apparatus on-board a spacecraft for providing a measured value for inclusion in the spacecraft telemetry to a ground station for use in determining the velocity of the spacecraft during two-way noncoherent Doppler tracking, the apparatus comprising:

a first counter, the first counter being driven by a downconverted uplink signal frequency to a predetermined number of zero-crossing counts;

a second counter, the second counter being driven by a signal frequency related to a downlink signal frequency to a measured number of zero-crossing counts; and a starting means for starting the first and second counters simultaneously;

wherein the first counter, upon reaching the predetermined number of counts, stops the second counter thereby producing the measured number of counts, the measured number comprising the measured value.

* * * * *

UNITED STATES PATENT AND TRADEMARK OFFICE
CERTIFICATE OF CORRECTION

PATENT NO. : 5,745,072
DATED : April 28, 1998
INVENTOR(S) : James Robert Jensen, et. al.

It is certified that error appears in the above-indentified patent and that said Letters Patent is hereby corrected as shown below:

In column 5, lines 26-27, after "frequency," delete "the downlink signal frequency".

In column 5, line 39, after "spacecraft" delete ";" and insert -- , --.

In column 5, line 40, after "frequency" insert -- ; --.

Signed and Sealed this

Thirtieth Day of June, 1998

Attest:

BRUCE LEHMAN

Attesting Officer

Commissioner of Patents and Trademarks